US006935741B2

(12) United States Patent
Denney

(10) Patent No.: US 6,935,741 B2
(45) Date of Patent: Aug. 30, 2005

(54) EYE SHIELD ATTACHMENT DEVICE AND ASSEMBLY

(76) Inventor: Randolph N. Denney, 6501 Weld County Rd. 86, Fort Collins, CO (US) 80524-9121

( * ) Notice: Subject to any disclaimer, the term of this patent is extended or adjusted under 35 U.S.C. 154(b) by 0 days.

(21) Appl. No.: 10/655,730

(22) Filed: Sep. 5, 2003

(65) Prior Publication Data

US 2005/0052610 A1 Mar. 10, 2005

(51) Int. Cl.[7] .............................................. G02C 3/00
(52) U.S. Cl. .............................. 351/155; 351/158; 2/10
(58) Field of Search ................................. 351/155, 158; 2/10, 6.3, 6.5, 451, 453

(56) References Cited

U.S. PATENT DOCUMENTS

| 256,393 | A | * | 4/1882 | Shone ........................ 351/155 |
| 2,538,608 | A | | 1/1951 | Vaca |
| 2,619,641 | A | | 12/1952 | Vaca |
| 5,533,207 | A | | 7/1996 | Diaz |
| 5,533,208 | A | * | 7/1996 | Tonoyan et al. ................. 2/10 |
| 5,720,040 | A | * | 2/1998 | Simone ........................... 2/10 |
| 5,987,640 | A | | 11/1999 | Ryder |
| 6,244,706 | B1 | | 6/2001 | Maher |

* cited by examiner

Primary Examiner—Huy Mai
(74) Attorney, Agent, or Firm—Ancel W. Lewis, Jr.

(57) ABSTRACT

An eye shield and head gear assembly with an attachment device which includes a support arm having one end portion that fastens by a first fastening means to the underside of the visor of a head gear and the other end portion that fastens by a second fastening means to the back side of the eye shield to mount the eye shield on the head gear. The support arm pivots at the first fastener to enable the eye shield to be moved between a retracted position under the visor and an extended position to shield the eyes. The second fastening means is movable along the back side of the eye shield in one embodiment or the support arm is length adjustable in a second embodiment so that the eye shield does not extend beyond the front edge of the visor in the retracted position and to allow the head gear to be adjusted to different elevations on the head in the eye shielding position. The eye shield is made of plastic sheet formed with a curve and a second embodiment has a metal layer along the top and bottom edges that will hold the eye shield sheet in a selected curve to conform to the curvature of the visor.

17 Claims, 3 Drawing Sheets

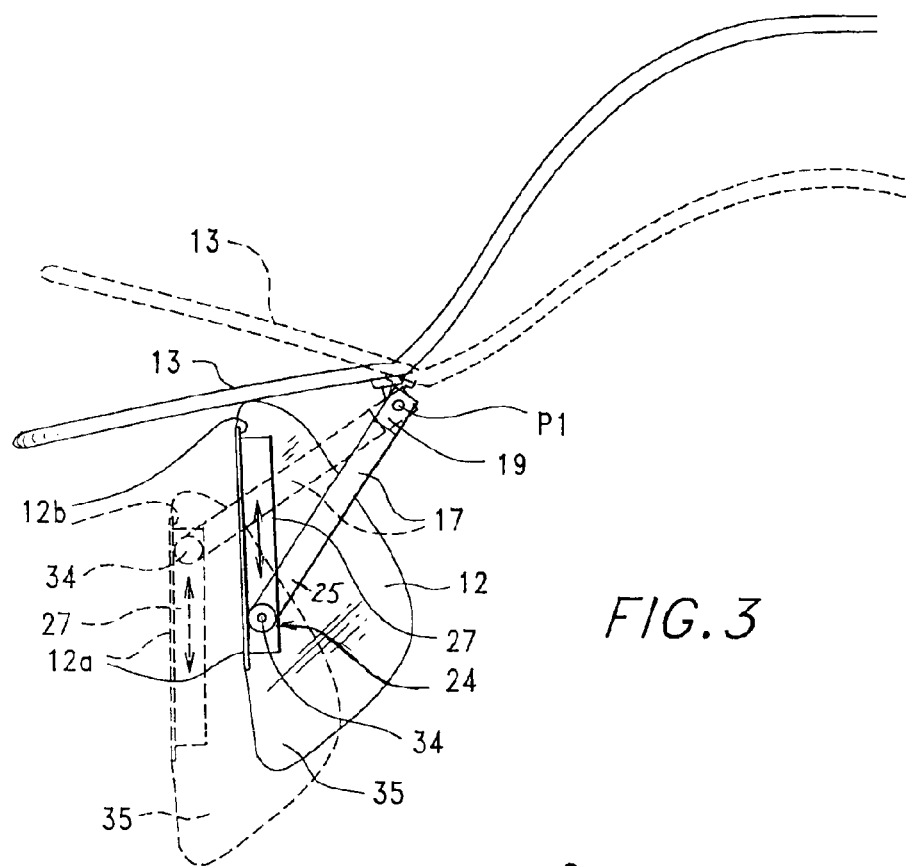
FIG. 3
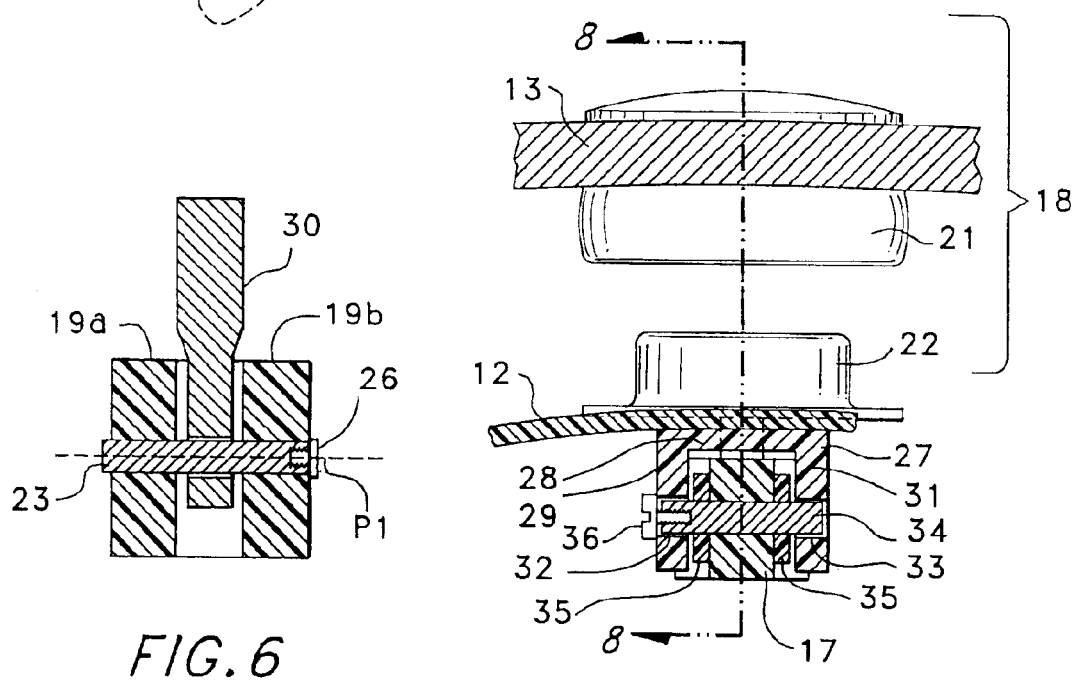
FIG. 6
FIG. 7

EYE SHIELD ATTACHMENT DEVICE AND ASSEMBLY

FIELD OF THE INVENTION

This invention relates to eye shields and more particularly to an eye shield attachment device that attaches an eye shield to the visor of a head gear to provide an eye shield and head gear assembly.

BACKGROUND OF THE INVENTION

A number of attempts have been made to attach eye shields to a visor of head gear. U.S. Pat. No. 5,533,207 to Diaz discloses an eyeglass and cap combination using an attachment fixture having a pivotal connection secured to the visor at one end and to an eyeglass flame at the other end so the eyeglasses may be pivoted into an operative position ahead of the users eyes or to a storage position out of the users line of sight.

U.S. Pat. No. 5,987,640 to Ryder discloses a visor and eye shield assembly including a base connected to the underside of the visor with a pivot at the visor of the cap and a pivot at the eye shield with adjustability along the visor of the cap.

U.S. Pat. No. 6,244,706 to Maher discloses an assembly for attaching sunglasses to a cap including a two-part hinging device enabling adjustment of the eyeglass vertically, horizontally, and diagonally.

U.S. Pat. No. 2,538,608 and U.S. Pat. No. 2,619,641 to Vaca discloses attachable eye shields for head gear that pivot between an up and down position on the visor of a head gear.

In the above patents, there is no ability to move the eye shield relative to the attachment device so the eye shield does not extend beyond the visor in the retracted position nor to change the position of the head gear on the head in the shielding position. The attachment device does not attach to the back side of the eye shield.

SUMMARY OF THE INVENTION

In accordance with the present invention there is provided an eye shield attachment device that fastens to a head gear visor and fastens to an eye shield to support the eye shield underneath the visor in a retracted position and the eye shield is movable to an eye shielding position in front of the eyes of the wearer of the head gear. The attachment device includes a support arm, a first fastening means on a first end portion of the support arm, a first pivot member pivotally connecting the first end portion to the fastening means to enable the support arm to pivot relative to the fastening means between the retracted and shielding positions and a second fastening means on a second end portion of the support arm connecting the support arm to the back side of the eye shield. The eye shield is movable so the eye shield does not extend beyond the forward edge of the visor and enables the elevation of the head gear on the head of a wearer to be changed. The movement is accomplished in one embodiment by a movable coupling between the eye shield and second end portion of the support arm and in another embodiment by having a support arm of adjustable length. In one embodiment the first fastening means is a snap fit connector. In a second embodiment the first fastening means is a bolt and a nut. A modified eyeglass has a metal strip along the top and bottom edges to hold the eyeglass at a selected curve with the ability to change the curve accordingly to the curve in the visor.

BRIEF DESCRIPTION OF THE DRAWINGS

FIG. 3 is a side elevation view of FIG. 1 without the head and only a front portion of the head gear and with the raised head gear position of FIG. 2 shown in dashed lines.

FIG. 6 is a sectional view taken along line 6—6 of FIG. 5.

FIG. 7 is a sectional view taken along line 7—7 of FIG. 5 but with the fastener portions separated.

DETAILED DESCRIPTION OF THE DRAWINGS

Figures 1, 2:
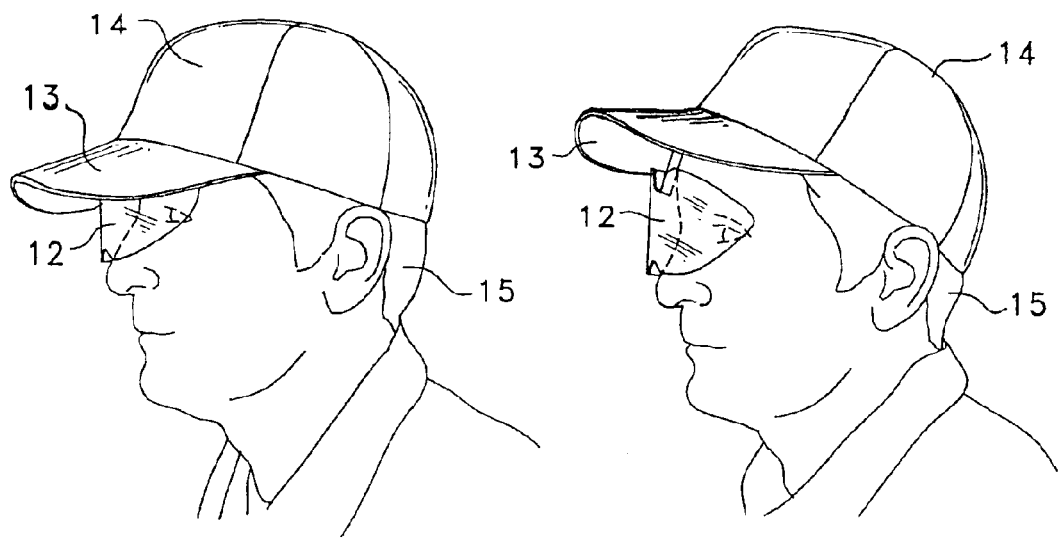
FIG. 1 is a perspective view of an eye shield and head gear assembly on the head of a wearer to with the eye shield in an eye shielding position.
FIG. 2 is a perspective view of the assembly shown in FIG. 1 with the head gear in a raised position on the head from that shown in FIG. 1.
Figure 4:
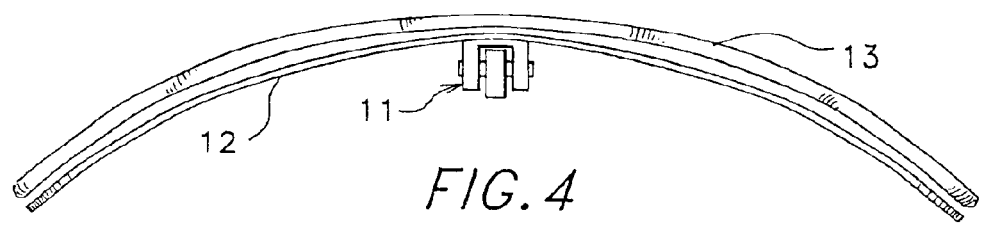
FIG. 4 is a front elevation view of FIG. 5.
Figure 5:
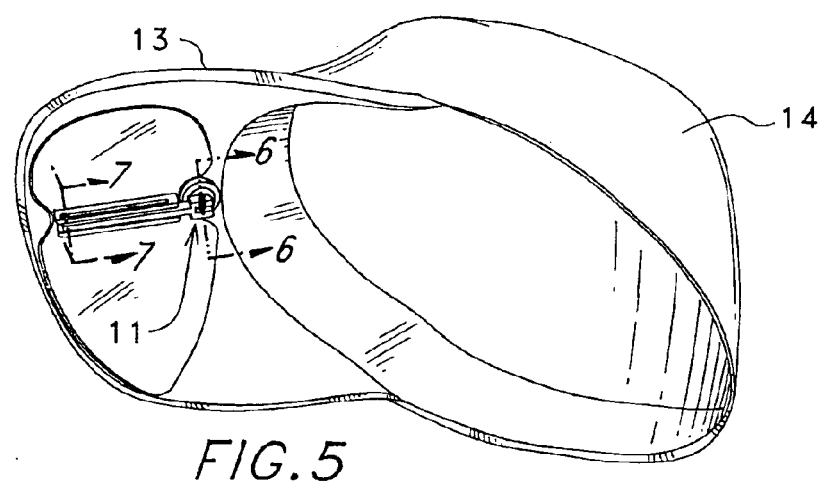
FIG. 5 is a bottom perspective view of the assembly shown in FIGS. 1 and 2 with the eye shield in a retracted position.
Figure 8:
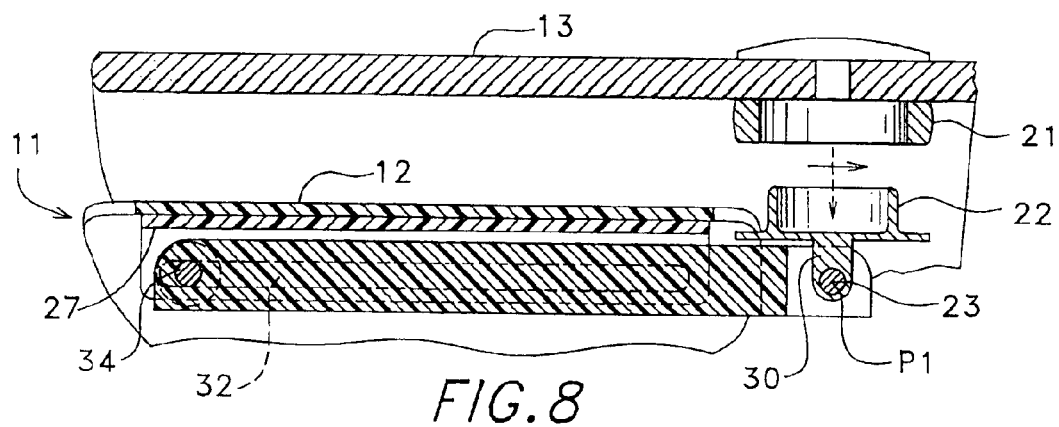
FIG. 8 is a sectional view taken along line 8—8 of FIG. 7.

Referring now to FIGS. 1–8, there is shown an attachment device 11 securing an eye shield 12 to the visor 13 of a head gear 14 to provide an integral eye shield and head gear assembly shown on the head 15 of a wearer. The eye shield is made of a plastic sheet material having a selected curvature along its length. The attachment device 11 shown has an elongated, rigid support arm 17 with a first fastening means or first fastener 18 on a first end portion 19 of the support arm 17 that detachably or removably fastens the device 11 to the visor so that it may be readily attached to and removed from the head gear 14. The first fastener 18 shown is a snap fit connector having a female portion 21 on the visor 13 and a male portion 22 on the first end portion 19. A pivot member 23 pivotally connects the first end portion 19 to the male portion 22 to allow the support arm 17 to pivot relative to the visor 13 about a first pivot axis P to enable the eye shield 12 to move between a retracted position extending along the underside of the visor and an eye shielding position at 90 degrees to the retracted position so the eye shield is in front of and transverse to the eyes of the wearer of the head gear 14.

The eye shield 12 has a front side 12a that faces away from the user in the shielding position and a back side 12b that faces toward the wearer in the shielding position. The first end portion 19 is bifurcated having a pair of spaced end sections 19a and 19b through which pivot member 23 extends transversely. The pivot member 23 is in the form of a pin with a set screw 26 threaded into one end of the pin to serve as a means to lock the support arm 17 at a selected position along the back side of the eye shield. A pin 30 extends transverse to and fastens to pivot member 23 and extends between the ends thereof into the center of male portion 22 and is secured thereto.

A movable coupling 24 connects to a second end portion 25 of the support arm opposite the first end portion 19 and to the back side 12b along a vertical center line of the eye shield 12 which allows the eye shield to be moved relative to the visor 13 so that the forward edge of the eye shield does not extend beyond the forward edge of the visor in the retracted position. The movable coupling 24 also enables the eye shield to be moved toward and away from the visor in the shielding position so that the elevation of the head gear may be changed in the eye shielding position.

The movable coupling 24 includes a guide member 27 in a shape of a channel having a base portion 28 and opposed spaced side wall portions 29 and 31 extending away from opposite sides of the base portion 28. A pair of opposed elongated slots 32 and 33 are provided in the side wall portions 29 and 31, respectively. The end portions of a slide pin 34 in second end portion 25 of support arm 17 slides in the slots 32 and 33 to enable the second end portion 25 to be moved along the slots. A set screw 36 threads in the end of the slide pin 34 so the end portion 25 may be locked to the support arm at a selected position. A washer 35 is provided on the slide pin 34 on each side of the support arm 17. This enables the eye shield to be moved along the underside of the visor in the retracted position so that the forward edge of the eye shield does not extend beyond the forward edge of the visor and also enables the eye shield to move toward and away from the visor in the shielding position and also be locked by the set screw 36 pin at any selected position to the eye shield. This enables the visor to be raised on the head as shown in FIG. 2. In the eye shielding position the movable coupling 24 is closer to the bottom edge of the eye shield and as the cap is raised moves toward the top edge of the eye shield as shown in FIG. 3.

Figure 9:
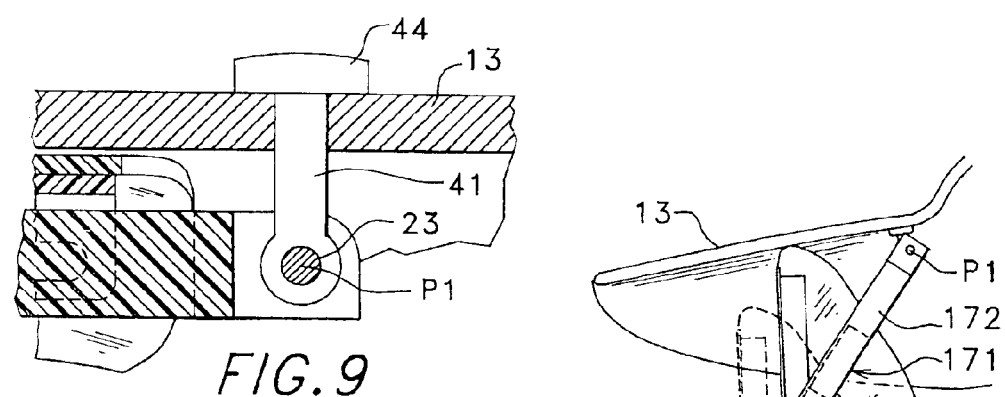
FIG. 9 is a sectional view like FIG. 8 showing an alternative fastener for connecting the support arm to the head gear visor.

Referring now to FIG. 9 there is shown an alternative fastener to the snap fit connector is in the form of a bolt 41 having external threads that is fastened to pivot member and extends through a hole 43 in the visor with a nut 44 threaded on the threads of the bolt.

Figure 10:
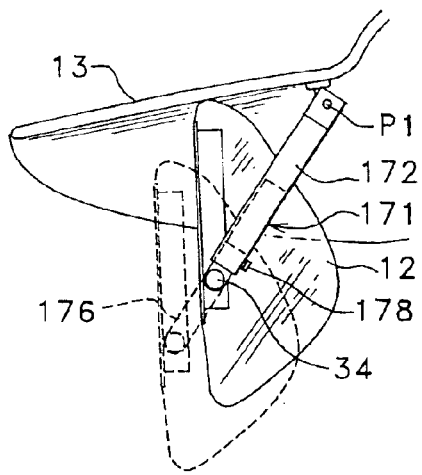
FIG. 10 is a side elevation view similar to FIG. 3 showing an alternative movement feature for the eye shield.

Referring now to FIG. 10 there is shown an alternative embodiment to FIG. 3 that allows the eye shield to be moved relative to the visor. The embodiment has a modified support arm 171 made up of an outer support arm section 172 and an inner support arm section 176 telescoping in section 172 so the support arm 171 is of an adjustable length. In the raised head gear position the support arm 171 is of greater length. A set screw 178 threaded into the outer support arm section and against the inner section 176 provides a means to lock the arm sections at a selected length to hold the position of the eye shield relative to the visor.

Figure 11:
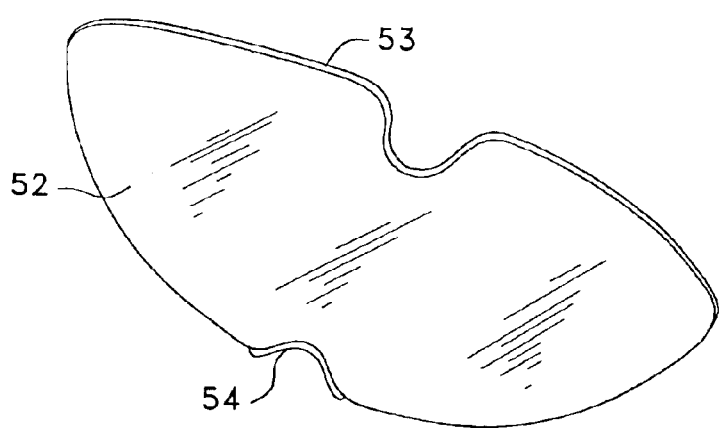
FIG. 11 is a plan view of a modified eye shield that will hold a selected curve.

Referring now to FIG. 11 a modified eye shield 52 has a metal layer 53 along the bottom edge of the plastic sheet material and a metal layer 54 along a portion of the top edge of the plastic material that will hold the plastic eye shield in a curve that conforms to the particular curve of the visor. This layer is like a metal wire that is embedded, bonded or adhesively secured to the plastic material.

Although the present invention has been described with a certain degree of particularity, it is understood that the present disclosure has been made by way of example and that changes in details of structure may be made without departing from the spirit thereof.

What is claimed is:

1. An attachment device for securing an eye shield to a visor of a head gear comprising:
   a support arm,
   first fastening means on a first end portion of said support arm for connecting said support arm to said visor,
   a pivot member pivotally connecting said first end portion to said first fastening means to allow said support arm to pivot relative to said first fastening means about a pivot axis to enable said eye shield to move between the retracted position extending along and nesting in and against an underside of said visor with said support arm below said shield and an eye shield position in front of and transverse to the eyes of a wearer of said head gear,
   second fastening means on a second end portion of said support arm for connecting said support arm to a back face of said eye shield,
   said eye shield being movable relative to said visor so that a forward edge of said eye shield does not extend beyond a front edge of said visor in said retracted position and so that the elevation of the head gear on the head of a wearer may be changed in said eye shielding position.

2. The device as set forth in claim 1 wherein said support arm includes two arm sections movable relative to one another to change the length of said support arm.

3. The device as set forth in claim 2 wherein said arm sections are an inner arm section telescoping within an outer arm section.

4. The device as set forth in claim 2 including means to lock said arm sections together to provide a selected support arm length.

5. The device as set forth in claim 1 wherein said first end portion is bifurcated having a pair of spaced end sections through which said pivot member transversely extends.

6. The device as set forth in claim 1 wherein said first fastening means is in the form of a male and female coupling portions that snap fit together under pressure and separate under pressure.

7. The device as set forth in claim 1 wherein said first fastener means is a threaded bolt attached to said support arm and extends through said visor and a nut threaded on said bolt above said visor.

8. The device as set forth in claim 1 wherein said eye shield has a curve that conforms to a curve of the visor to nest in and against an underside of said visor in said retracted position.

9. The device as set forth in claim 1 wherein said eye shield is made of a sheet of plastic and has a layer of metal secured along the top and bottom edges of said plastic to hold said plastic in a curve selected by the wearer.

10. The device as set forth in claim 1 wherein said second fastening means has means to lock said second end portion in a selected position along on said eye shield.

11. The device as set forth in claim 1 wherein said second fastening means includes a movable coupling portion that enables said second fastening means to connect at a range of different positions along the back face and between the top and bottom of said shield.

12. The device as set forth in claim 1 wherein said first fastening means connects to a rear portion of the underside of said visor.

13. An attachment device for securing an eye shield to a visor of a head gear comprising:
   a support arm,
   a first fastener on a first end portion of said support arm for detachably connecting said support arm to a rear portion of an underside of said visor,
   a pivot member pivotally connecting said first end portion to said first fastener to allow said support arm to pivot relative to said first fastener about a pivot axis through an angle of about 90 degrees to enable said eye shield to move between the retracted position extending along and nested in and directly against an underside of said visor with said support arm below said eye shield and an eye shield position in front of and transverse to the eyes of a wearer of said head gear,
   a second fastener on a second end portion of said support arm for connecting said support arm to a back face of and along a vertical center line of said eye shield, said second fastener including a movable coupling portion that enables said second fastener to connect at a range of different positions along the back face and between the top and bottom of said shield, said eye shield being movable relative to said visor so that a forward edge of said eye shield does not extend beyond a front edge of said visor in said retracted position and so that the elevation of the head gear on the head of a wearer may be changed in said eye shielding position.

14. An attachment device for securing an eye shield to a visor of a head gear comprising:

a support arm, first fastening means on a first end portion of said support arm for connecting said support arm to said visor, a pivot member pivotally connecting said first end portion to said first fastening means to allow said support arm to pivot relative to said first fastening means about a pivot axis to enable said eye shield to move between the retracted position extending along the underside of said visor and an eye shield position in front of and transverse to the eyes of a wearer of said head gear, second fastening means on a second end portion of said support arm for connecting said support arm to a back side of said eye shield, said second fastening means includes a movable coupling, said movable coupling including a guide member in the shape of a channel having a base portion and opposed spaced side wall portions extending away from opposite sides of said base portion, a pair of opposed elongated slots in said side wall portions with end portions of a slide pin on said second end portion slidable in said slots, said eye shield being movable relative to said visor so that a forward edge of said eye shield does not extend beyond a front edge of said visor in said retracted position and so that the elevation of the head gear on the head of a wearer may be changed in said eye shielding position.

15. An attachment device for securing an eye shield to a visor of a head gear comprising:

a support arm, said support arm including two arm sections movable relative to one another to change the length of said support arm, first fastening means on a first end portion of said support arm of connecting said support arm to said visor, a pivot member pivotally connecting said first end portion to said first fastening means to allow said support arm to pivot relative to said first fastening means about a pivot axis to enable said eye shield to move between the retracted position extending along and nesting in and directly against the underside of said visor with said support arm below said shield and an eye shield position in front of and transverse to the eyes of a wearer of said head gear, second fastening means on a second end portion of said support arm for connecting said support arm to a back face of said eye shield, said eye shield being movable relative to said visor as the length of said support arm is changed so that a forward edge of said eye shield does not extend beyond a front edge of said visor in said retracted position and so that the elevation of the head gear on the head of a wearer may be changed in said eye shielding position.

16. An eye shield and head gear assembly comprising:

an eye shield, a head gear having a visor, and an attachment device for mounting said eye shield on said visor, said attachment device having, a support arm, first fastening means on a first end portion of said support arm for connecting said support arm to said visor, a pivot member pivotally connecting said first end portion to said first fastening means to allow said support arm to pivot relative to said first fastening means about a pivot axis to enable said eye shield to move between the retracted position extending along and nesting in and directly again the underside of said visor with said support arm below said eye shield and an eye shield position in front of and transverse to the eyes of a wearer of said head gear, second fastening means on a second end portion of said support arm for connecting said support arm to said eye shield, said eye shield being movable relative to said visor so that a forward edge of said eye shield does not extend beyond a front edge of said visor in said retracted position and so that the elevation of the head gear on the head of a wearer may be changed in said eye shielding position.

17. An attachment device for securing an eye shield to a visor of a head gear comprising:

a support arm, first fastening means on a first end portion of said support arm for connecting said support arm to said visor, a pivot member pivotally connecting said first end portion to said first fastening means to allow said support arm to pivot relative to said first fastening means about a pivot axis to enable said eye shield to move between the retracted position extending along the underside of said visor and an eye shield position in front of and transverse to the eyes of a wearer of said head gear, second fastening means on a second end portion of said support arm for connecting said support arm to said eye shield, said second fastening means including a movable coupling, said movable coupling including a guide member in the shape of a channel having a base portion and opposed spaced side wall portions extending away from opposite sides of said base portion, a pair of opposed elongated slots in said side wall portions with end portions of a slide pin on said second end portion slidable in said slots, said eye shield being movable relative to said visor so that a forward edge of said eye shield does not extend beyond a front edge of said visor in said retracted position and so that the elevation of the head gear on the head of a wearer may be changed in said eye shielding position.

* * * * *